United States Patent
Ahmed et al.

(10) Patent No.: US 9,547,651 B1
(45) Date of Patent: Jan. 17, 2017

(54) ESTABLISHING FILE RELATIONSHIPS BASED ON FILE OPERATIONS

(71) Applicant: EMC Corporation, Hopkinton, MA (US)

(72) Inventors: Faiyaz Ahmed, Oakland, CA (US); Xuan Wang, San Jose, CA (US); Dieter Rothmeier, Soquel, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 220 days.

(21) Appl. No.: 14/231,293

(22) Filed: Mar. 31, 2014

(51) Int. Cl.
*G06F 17/30* (2006.01)

(52) U.S. Cl.
CPC ..... *G06F 17/3007* (2013.01); *G06F 17/30212* (2013.01)

(58) Field of Classification Search
CPC ................................................. G06F 17/30212
See application file for complete search history.

(56) References Cited

U.S. PATENT DOCUMENTS

| | | | | |
|---|---|---|---|---|
| 8,655,848 | B1* | 2/2014 | Leverett | G06F 17/30088 707/660 |
| 2007/0038689 | A1* | 2/2007 | Shinkai | G06F 17/30079 |
| 2007/0174911 | A1* | 7/2007 | Kronenberg | G06F 21/56 726/22 |
| 2010/0094813 | A1* | 4/2010 | Brueggemann | G06F 17/30156 707/692 |
| 2011/0016085 | A1* | 1/2011 | Kuo | G06F 17/30212 707/615 |
| 2011/0270809 | A1* | 11/2011 | Dinkar | G06F 17/30156 707/692 |
| 2012/0268610 | A1* | 10/2012 | Inui | G06F 3/04883 348/207.1 |
| 2014/0108356 | A1* | 4/2014 | Yanagisawa | G06F 17/30115 707/687 |
| 2015/0180741 | A1* | 6/2015 | Buchanan | G06F 21/6218 709/213 |

\* cited by examiner

*Primary Examiner* — Mohammad S Rostami
(74) *Attorney, Agent, or Firm* — Blakely, Sokoloff, Taylor & Zafman LLP

(57) ABSTRACT

Establishing file relationships based on file operations is disclosed. In various embodiments, a base file relationship between a file associated with a file operation and a base file of the file associated with the file operation is determined programmatically. A base file attribute data that represents the base file relationship between the file associated with the file operation and the base file is stored.

16 Claims, 7 Drawing Sheets

ESTABLISHING FILE RELATIONSHIPS BASED ON FILE OPERATIONS

BACKGROUND OF THE INVENTION

Certain data storage system operations may involve creating a file that is wholly or partly a clone or other copy of another file. For example, certain snapshot and/or related technologies may involve create a clone or other copy of a file or set of files.

Data storage systems may be configured to take advantage of the fact that files created by cloning or otherwise copying existing files have, at least initially, a great deal of data in common with the file based on which they were created. Deduplication storage systems, for example, may store each data segment only once, and may for each file that includes a given segment include only a pointer to the single stored instance of the segment.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Establishing file relationships, e.g., generational relationships, based on file operations is disclosed. In various embodiments, file operations, such as file copy, clone, or other file system operations, are monitored. Upon detecting that a file has been created at least in part by copying another file, a base file relationship is determined for the file, and data representing the relationship between the file and its base file is stored persistently. In various embodiments, the stored base file-file relationship data may be used to optimize an operation, such a file replication.

Figure 1:
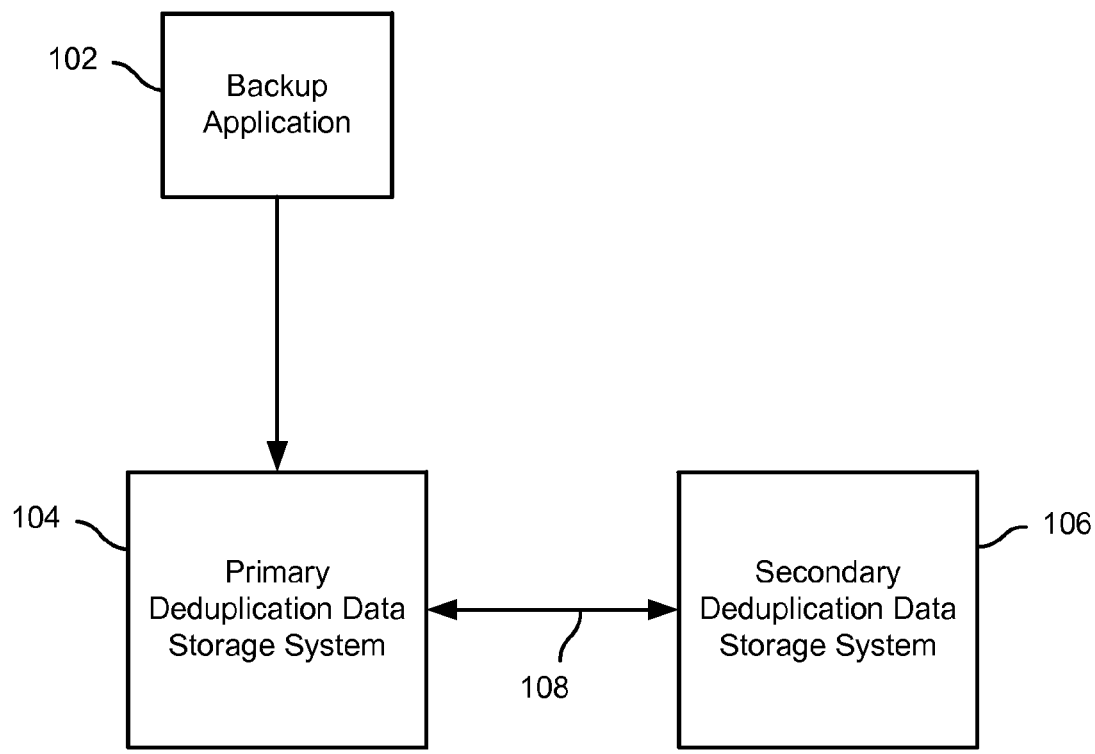
FIG. 1 is a block diagram illustrating an embodiment of a system to establish file relationships based on file operations.

FIG. 1 is a block diagram illustrating an embodiment of a system to establish file relationships based on file operations. In the example shown, a backup application 102 provides backup data to a primary deduplication data storage system 104. For example, an EMC® Avamar® backup agent, application, appliance, and/or system may provide backup data to a primary data center and/or other location at which primary deduplication data storage system 104 is installed. In various embodiments, primary deduplication data storage system 104 may comprise an EMC® Data Domain® deduplication storage system. In the example shown, primary deduplication data storage system 104 replicates data to a secondary deduplication data storage system 106 over a wide area network (or other network) 108. Data may be replicated from primary deduplication data storage system 104 to secondary deduplication data storage system 106, for example, to provide disaster recovery protection, e.g., by enabling data backed up by backup application 102 to be recovered from secondary deduplication data storage system 106 if primary deduplication data storage system 104 were to become unavailable.

In various embodiments, replication of data from primary deduplication data storage system 104 to secondary deduplication data storage system 106 over network 108 is performed at least in part by sending from primary deduplication data storage system 104 to secondary deduplication data storage system 106 a set of fingerprints or other data representative of data segments comprising a file, and receiving an indication of which data segments the secondary deduplication data storage system 106 does not already have stored. The missing segments are then sent from primary deduplication data storage system 104 to secondary deduplication data storage system 106 via network 108.

In various embodiments, primary deduplication data storage system 104 is configured to determine a base file relationship between a file that is created at primary deduplication data storage system 104 by making a copy of another file, on the one hand, and a base file with which the newly-created file is associated. In various embodiments, the determination may be based at least in part on a file operation associated with the file, e.g., a file copy operation.

In various embodiments, primary deduplication data storage system 104 determines programmatically a base file for the file, and stores persistently data reflecting the generational relationship between the base file and the file.

In various embodiments, the persistently stored data indicating the base file relationship may be used to perform a subsequent operation more efficiently, e.g., a replication operation such as described above. For example, in some embodiments, a base file relationship may be used to determine efficiently that certain segments comprising a file have already been replicated to a replication target, e.g., secondary deduplication data storage system 106 in the example shown in FIG. 1. For example, if data segments common to a file and its base file have already been replicated in connection with replication of the base file, for example and without limitation, in some embodiments it may not be necessary to send corresponding fingerprints from the primary deduplication data storage system 104 to the secondary deduplication data storage system 106, for example, since it can be determined based on the base file relationship that the segments common to the file and its base file have already been sent.

Figure 2:
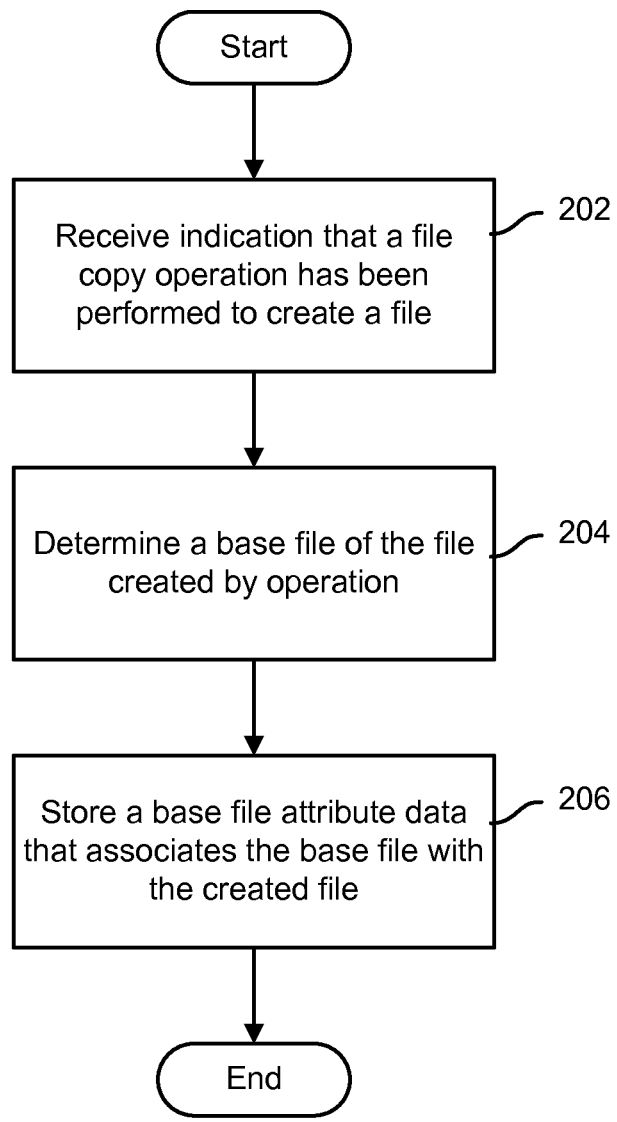
FIG. 2 is a flow chart illustrating an embodiment of a process to establish file relationships based on file operations.

FIG. 2 is a flow chart illustrating an embodiment of a process to establish file relationships based on file operations. In some embodiments, the process of FIG. 2 may be implemented by a data storage system, such as primary deduplication data storage system 104 of FIG. 1. In the example shown, an indication is received that a file copy (or similar/other) operation has been performed to create a file (202). A base file of the file, if any, is determined (204). In various embodiments, the base file is determined programmatically. For example, in some embodiments, the base file may be the file that was copied to create the file. In some embodiments, the base file may be determined programmatically to be a base file associated with the file that was copied to create the file, e.g., a file created by copying the base file at a prior time. A base file attribute data that associates the determined base file with the created file is stored (206). For example, a tuple or other data that associates the base file with the created file may be stored in a table or other data structure. In some embodiments, a base file attribute of an object or other data structure used to hold file metadata may be set to an identifier or other value associated with the base file.

Figure 3:
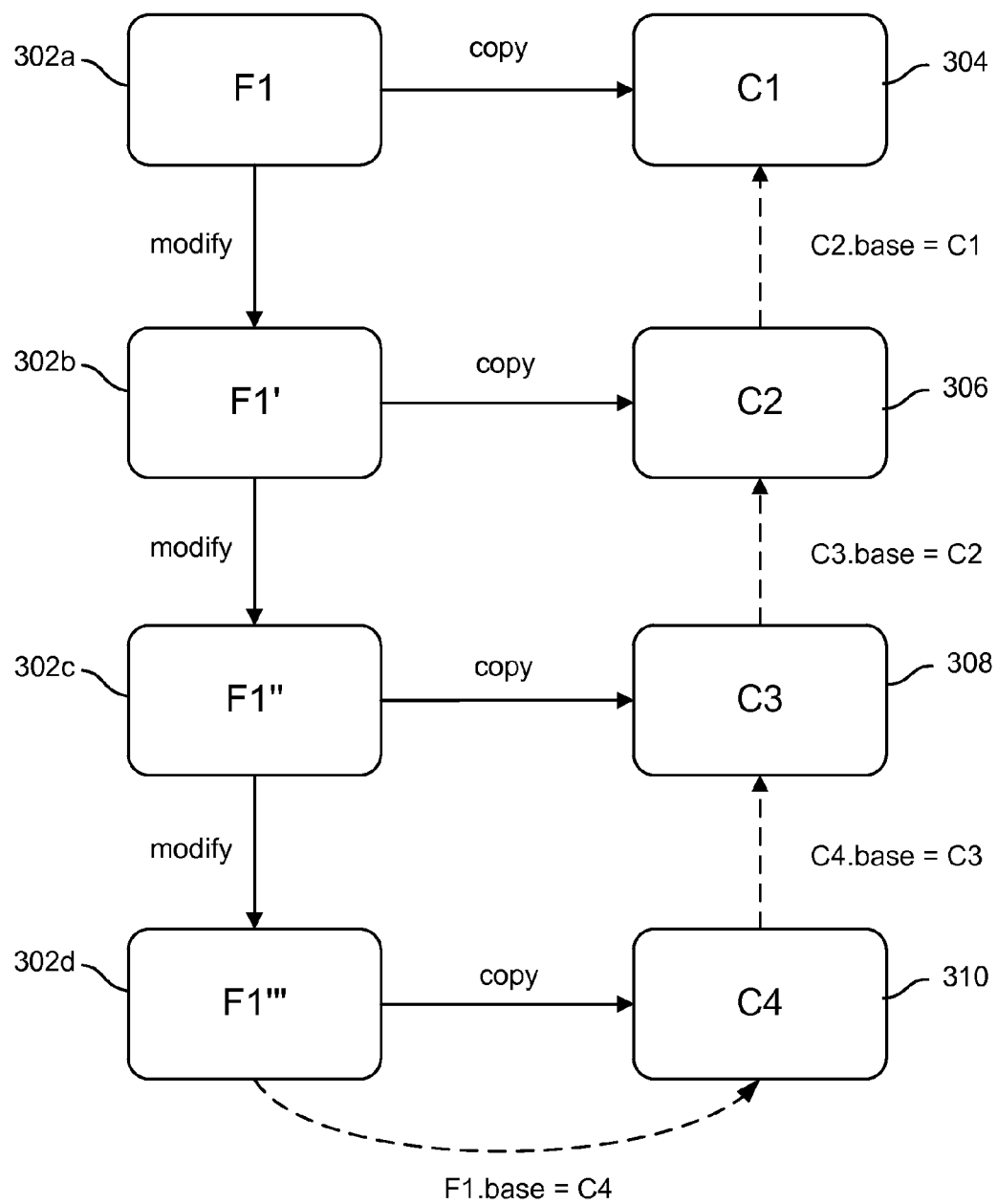
FIG. 3 is a block diagram illustrating an embodiment of a system to establish file relationships based on file operations.
Figure 5:
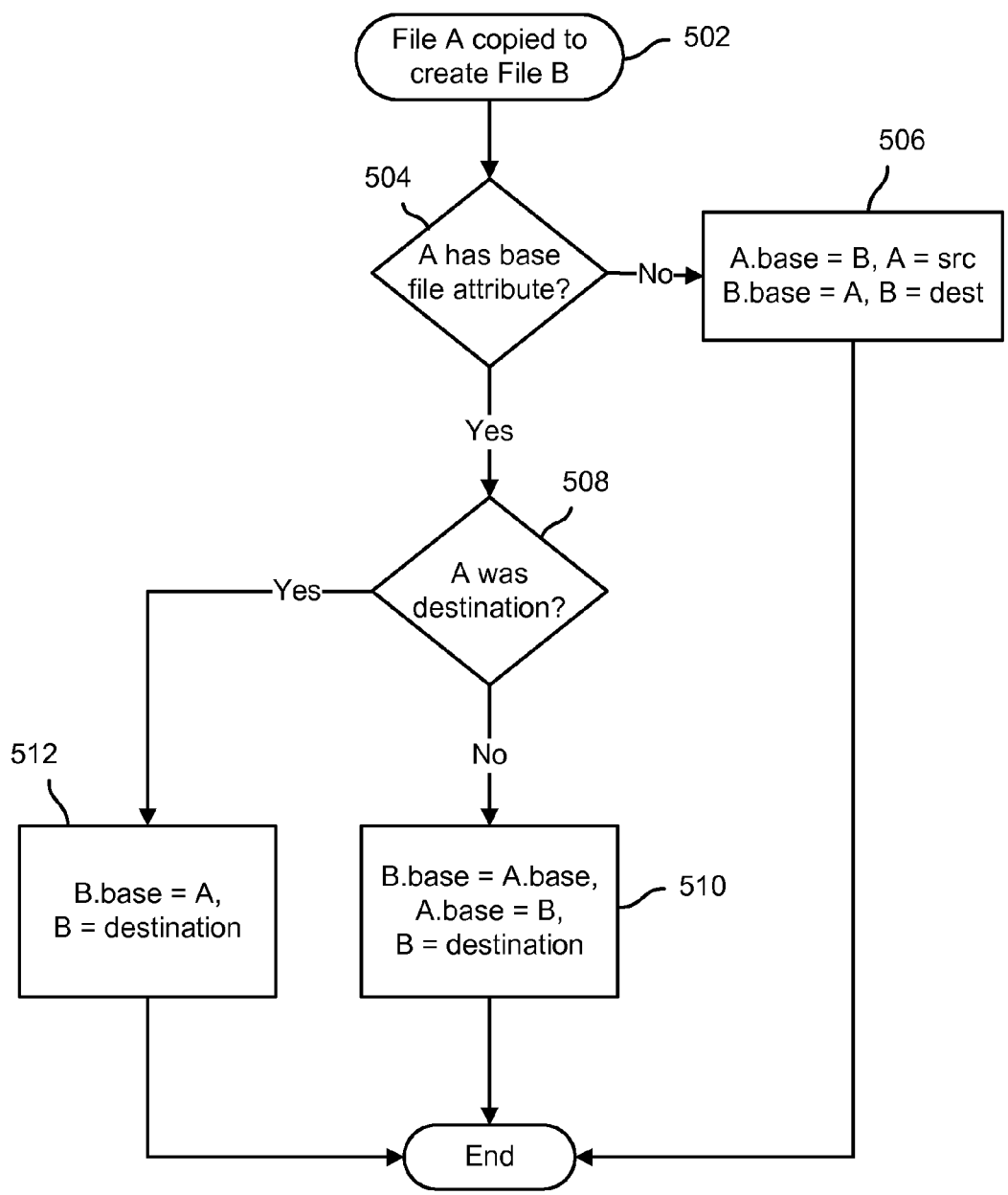
FIG. 5 is a flow chart illustrating an embodiment of a process to establish file relationships based on file operations.

FIG. 3 is a block diagram illustrating an embodiment of a system to establish file relationships based on file operations. In various embodiments, the files shown in FIG. 3 may be stored on, and/or the file operations shown in FIG. 3 may be performed by, a deduplication or other data storage system, such as primary deduplication storage system 104 of FIG. 1. In the example shown in FIG. 3, a file F1 (302*a*) is copied to create a copy file C1 (304). Initially, in some embodiments, the copy operation by which the file C1 is created may result in file F1 being identified as a base file of file C1, and vice versa. In the example shown, modifications are made to file F1 resulting in a modified file F1' (302*b*). In this example, modifications are not made to the copy file C1 (304). A copy file C2 (306) is made of the file F1 in the state F1' (302*b*), i.e., after modifications have been made to file F1 (302*a*) subsequent to the copy file C1 (304) having been made. In the example shown, a determination has been made programmatically that the earlier-copied file C1 (304) is a base file of the later-copied file C2 (306). An example of a process to make such a determination programmatically is illustrated in FIG. 5, described below. In the example shown in FIG. 3, the file C1 (304) may be identified as a base file of the file C2 (306) in various embodiments based on a relationship between the file C1 (304) and the file F1 (302*a*), e.g., that the file C1 is a base file of the file F1 (in state F1') (302*a, b*) that was copied to create the file C2 (306). Similarly, in the example shown in FIG. 3, further changes were made to the file F1 to yield the file F1 in state F1" (302*c*), and a copy of file F1 in state F1" (302*c*) was made to create file C3 (308). A determination is shown as having been made that the previously-copied file C2 (306) is a base file of the file C3 (308). Finally, further modifications to the file F1 result in the file F1 in a state F1''' (302*d*). A copy C4 (310) has been made, and a determination has been made that the previous copy file C3 (308) is a base file of the copy file C4 (310). In addition, in the state shown in FIG. 3, the most recent copy file C4 (310) is identified as a base file of the file F1 (302*a-d*). In some embodiments, the successive copy files C1 through C4 (304, 306, 308, 310) each is identified in turn as a base file for the file F1 (302*a-d*) at a time the copy file is created, and in some embodiments each copy file continues to be identified as a base file of the file F1, in use scenarios such as the one shown in FIG. 3, until a more recent copy of the file F1 is made.

Figure 4:
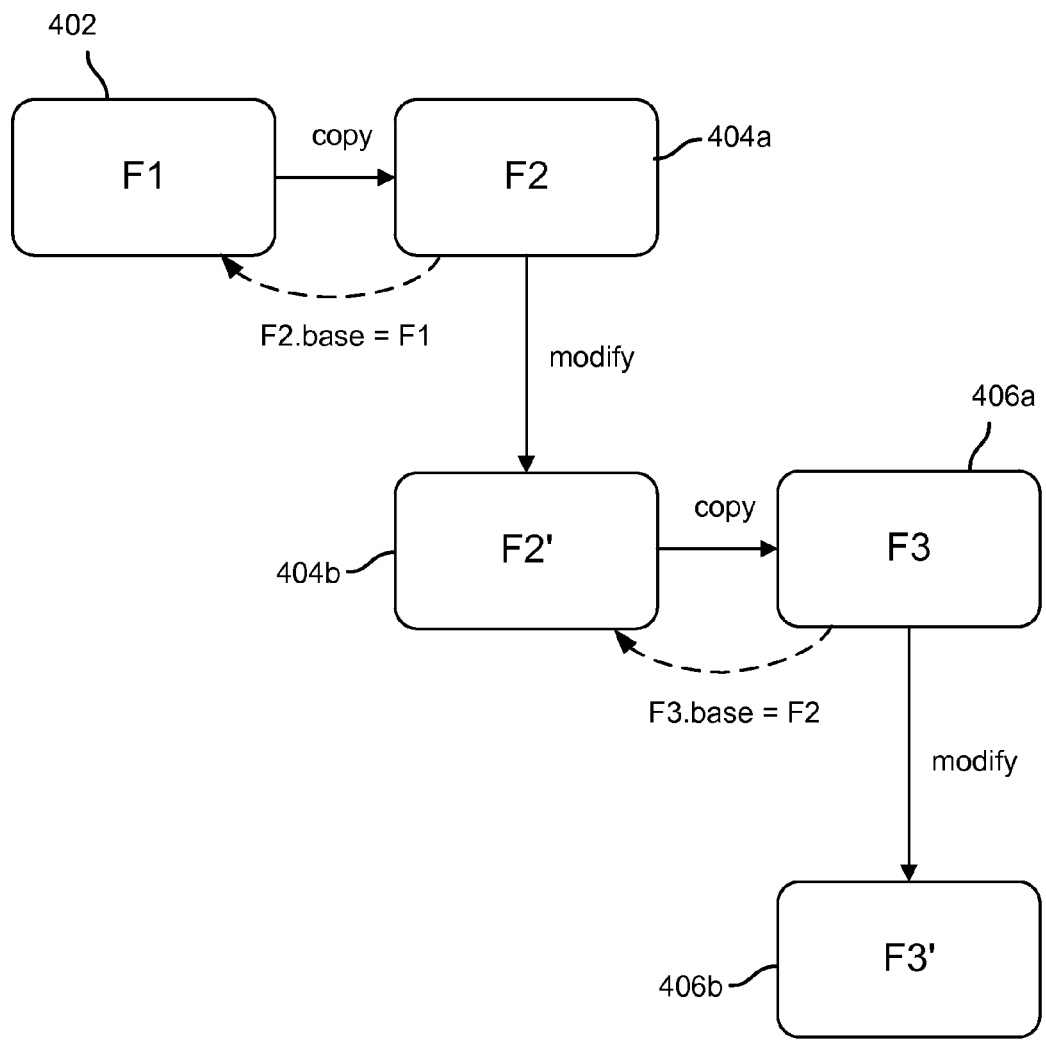
FIG. 4 is a block diagram illustrating an embodiment of a system to establish file relationships based on file operations.

FIG. 4 is a block diagram illustrating an embodiment of a system to establish file relationships based on file operations. In the example shown in FIG. 4, in contrast to the example shown in FIG. 3, modifications are made to the copy file, while the file that was copied to create the copy file remains unchanged. Specifically, a file F1 (402) is copied to create a copy file F2 (404*a*). The file F1 remains unchanged, while modifications are made to the file F2 to create file F2 in the state F2' (404*b*). As shown in FIG. 4, in this example the file F1 (402) is identified as a base file of the file F2 (404*a*, 404*b*). In the example shown, the file F2 in state F2' (404*b*) is copied to create the file F3 (406*a*), which is modified to result in file F3 in state F3' (406*b*). The file F2 (404*a*, 404*b*), which in the example shown remains unchanged after being modified to be in the state F2' (404*b*), has been identified as a base file of the file F3 (406*a*, 406*b*).

FIG. 5 is a flow chart illustrating an embodiment of a process to establish file relationships based on file operations. In the examples shown in FIGS. 3 and 4, for example, the file that is determined to be a base file may be an earlier generation copy file, as in FIG. 3, or a file that has been copied, as in FIG. 4. In various embodiments, the process of FIG. 5 is used to determine programmatically which file is to be identified as a base file, including whether it is the source (i.e., copied file) or destination (i.e., file create by the copy operation) of the copy operation that is to be identified programmatically as the base file. In the example shown in FIG. 5, when an indication that a file copy (or clone, etc.) operation has been performed (502), in this example a file A copied to create a copy file B, e.g., it is determined whether the source (i.e., copied) file has a base file attribute associated with it (504). For example, a table, database, data object, or other data store may be checked to determine whether a value had been set previously to identify a base file of the file A. If there is no base file attribute set for the file A (504), the base file attribute of file A (i.e., "A.base", in the example shown) is set to be the copy file B created via the file copy operation; the file A is identified as the "source" of the file operation; the base file attribute of the file B is set to be the copied file A ("B.base=A" in the example shown); and file B is identified as the "destination" or target file create by the file copy operation (506).

If the file A is determined to have a base file attribute (504), it is determined whether the copied file A was flagged or otherwise identified as the "destination" of a file operation that resulted in the base file attribute being determined and stored for file A (508). If the file A was not the "destination" of that file operation, e.g., it was instead the "source", then the base file attribute of the file B in this example is set to be the same as the previously-stored base file attribute of the file A, i.e., "B.base=A.base" in the example shown; the base file of the file A is set to be the copy file B; and the copy file B is identified as the "destination" of the file operation that resulted in the foregoing base file values being determined and set (510). An example of such a scenario is shown in FIG. 3. For example, in the example shown in FIG. 3, the base file of the file F1 (302*a*) may have been set to be the file C1 (304), and vice versa. The later file copy operation in which the file F1 in state F1' (302*b*) was copied to create file C2 (306), the base file attribute of the file F1 (302*a*) would have been found to have been set (e.g., F1.base=C1) and the file F1 identified as the "source" of the file operation by which File C1 was created. As a result, under the process shown in FIG. 5 (502, 504, 508, 510), the base file of the file C2 (306) would be set to be the same as the previously-determined base file of the file F1 (302*a*), i.e., the file C1 (304), the base file of the file F1 (302*b*) would be set to the file C2 (306), and the file C2 would be tagged or otherwise identified as the "destination" of the file operation by which file C2 was created.

Referring further to FIG. 5, if the file A is determined to have a base file attribute stored (504) and the file A is determined to have been the destination of the file operation with respect to which that base file was determined (508), then the base file of file B is set to be the file A and the file B is identified as the destination of the file operation (512). An example of such a scenario is shown in FIG. 4. In the example shown in FIG. 4, under the process of FIG. 5 the base file of file F1 (402) would be determined to be file F2 (404*a*), and vice versa. Subsequently, in connection with the file operation by which the file F2 in state F2' (404*b*) was copied to create file F3 (406*a*), the file F2 would be found to have had a base file attribute stored (504) and to have been the "destination" of the file operation (508), which under the process of FIG. 5 would result in the base file of file F3 (406*a*) being set to be the file F2 (in state F2') (404*b*), as shown in FIG. 4.

The process of FIG. 5, in various embodiments, enables a base file relationship to be determined programmatically, even if one of a plurality of possible use cases/scenarios occurs. For example, either a destination file created in a prior, related file operation, as in FIG. 3, or the source file copied in the file operation, as in FIG. 4, would be identified as a base file. In either case, a base file is determined for a file created in a file operation, and data reflecting the base file relationship is stored persistently.

While in the examples shown in FIGS. 3 and 4, for example, a file is created by making a copy of an existing file, which is determined to be a base file of the file created in the file copy operation, in various embodiments, a base file relationship may be determined and corresponding base file attribute data may be stored based on a file operation other than a file copy operation. For example, in some embodiments, selection portions for two or more files may be combined, optionally with new file content data, to create a file. In some embodiments, a base file relationship would be determined, using techniques disclosed herein, between the file created in the operation and each of the files all or part of which were included in the content of the created file. In various embodiments, for each base file a base file attribute indicating the base file relationship would be stored. In some embodiments, additional data indicating which portions of a particular base file were used to create the file that was created in the operation may be stored.

In various embodiments, data reflecting a base file relationship may be used to perform an operation, such as a data replication or other data transfer operation, more efficiently.

Figure 6:
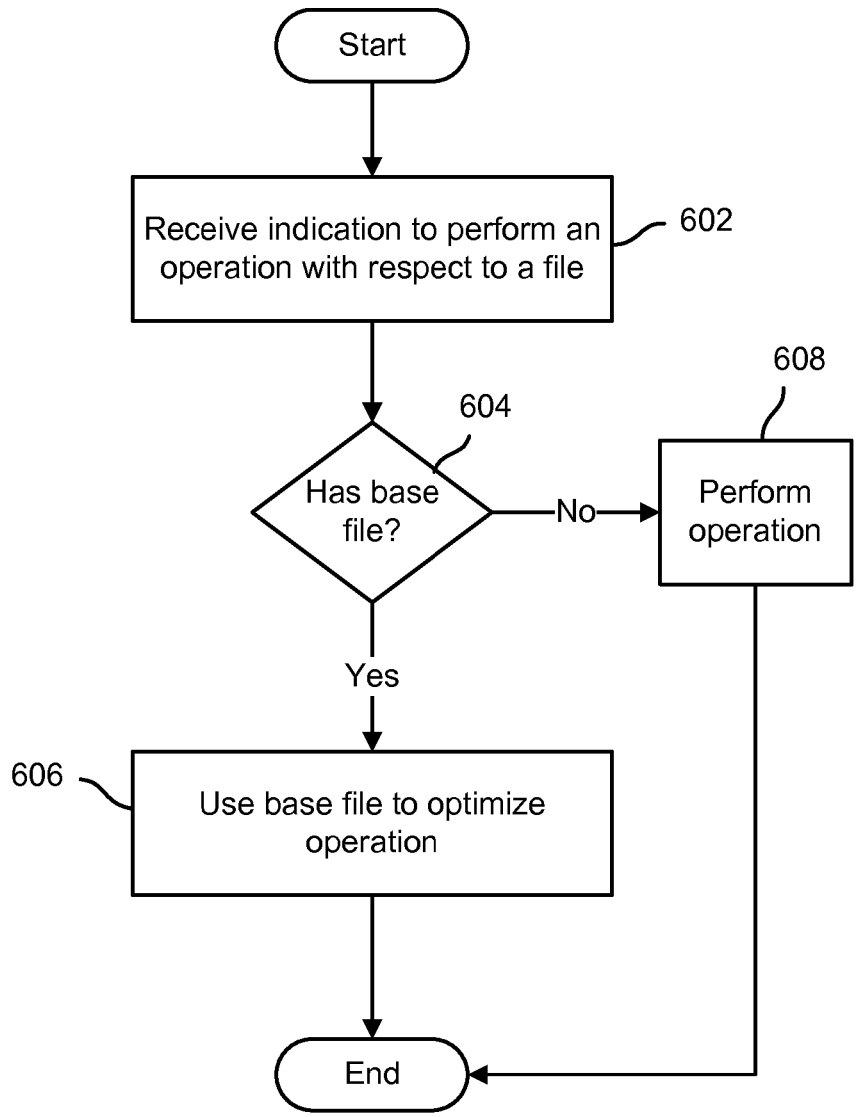
FIG. 6 is a flow chart illustrating an embodiment of a process to optimize an operation based on a base file relationship.

FIG. 6 is a flow chart illustrating an embodiment of a process to optimize an operation based on a base file relationship. In various embodiments, the process of FIG. 6 may be performed by a data storage system, such as primary deduplication data storage system 104 of FIG. 1. In the example shown, an indication is received to perform an operation with respect to file (602). For example, an indication may be received to replicate a file across a network to a remote disaster recovery node, e.g., secondary deduplication data storage system 106 of FIG. 1. It is determined whether the file has a base file attribute (or other base file relationship data) stored (604). If so, the operation is attempted to be performed in a manner that uses the base file relationship to optimize the operation (606). For example, if the operation were to replicate the file to a remote node, the optimization may include determining which segments the file has in common with the base file, and which of those may already have been replicated to the remote node, for example in connection with an earlier operation to replicate the base file to the remote node. In some embodiments, if a file has a base file attribute set but the base file is determined to have been modified since the operation by which the file was created, then the optimization is aborted. If no base file has been identified (604), the operation is performed without the benefit of using the base file information to attempt to optimize the operation (608).

Figure 7:
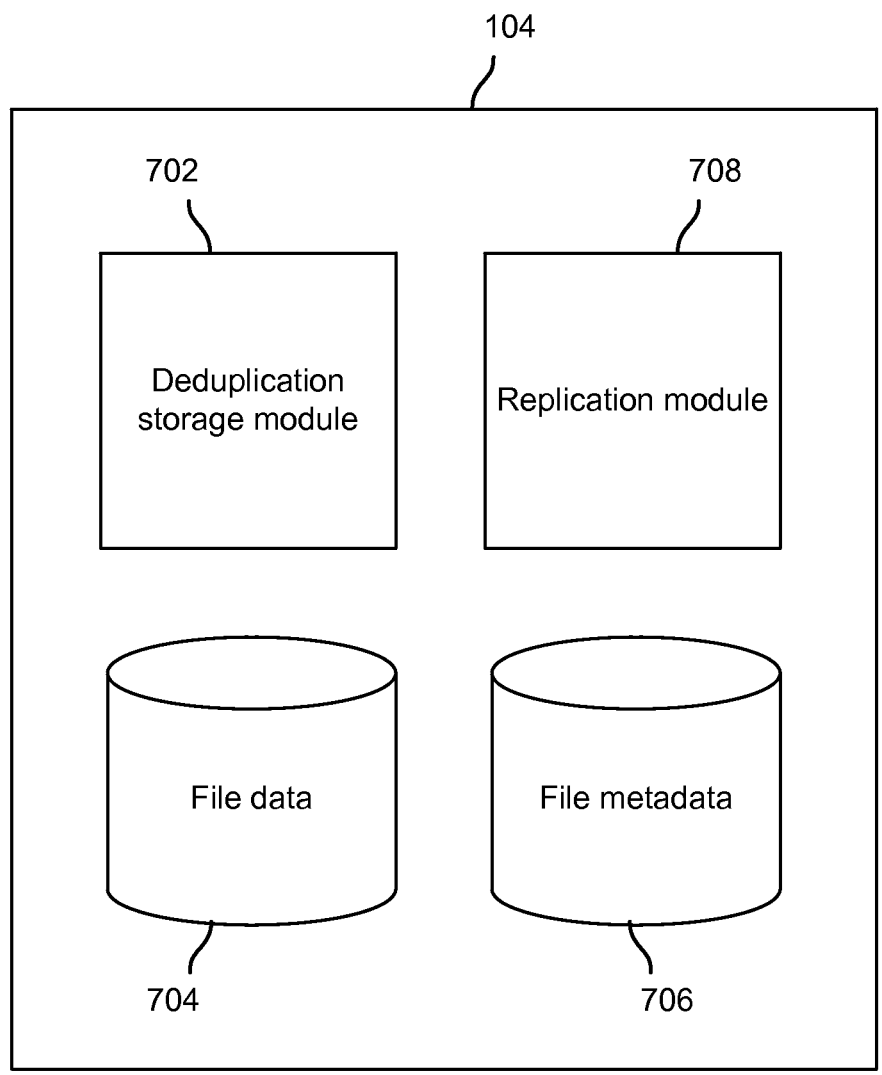
FIG. 7 is a block diagram illustrating an embodiment of a system to establish file relationships based on file operations.

FIG. 7 is a block diagram illustrating an embodiment of a system to establish file relationships based on file operations. In the example shown, primary deduplication data storage system 104 of FIG. 1 is shown to include a deduplication storage module 702, which receives file data, e.g., from backup application 102 of FIG. 1, and stores the file data in a deduplicated manner in a file data store 704. In various embodiments, file data store 704 may comprise one or more disk drives on which file segments are stored. Each file may comprise a plurality of segments. Segments common to two or more files are stored only once in file data store 704. In various embodiments, each file comprises a b-tree or other data structure in which data identifying the segments comprising the files, e.g., pointers, are stored. In the example shown, file metadata store 706 is used to store file metadata, including without limitation the base file relationship identification data as described herein.

In various embodiments, the deduplication storage module 702 and/or a file system and/or associated stack used to store and manage file data in file data store 704 includes logic to detect that a file operation is being performed, such a file copy operation, and to determine and store persistently base file relationship data, as disclosed herein.

In the example shown in FIG. 7, a replication module 708 replicates to a remote (e.g., disaster recovery) node files store on the primary deduplication data storage system 104. The replication module 708 in various embodiments is configured to use a base file relationship attribute or other base file relationship data to optimize a replication operation, for example by determining which, if any, segments common to the base file and the file to be replicated have already been replicated to the remote node.

In various embodiments, making such a determination at the sending node based on the base file relationship may avoid the need to send segment fingerprints for such segments over the network to the remote node, thereby conserving network bandwidth and associated overhead, e.g., I/O latency associated with fingerprint lookup and filtering for duplicate segments, at both ends.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   determining programmatically a base file relationship between a destination file created by a file copy operation and a base file of a source file associated with the file copy operation, wherein determining the base file relationship includes
   when the source file is already associated with base file attribute data, identifying an earlier generation of the destination file created by the file copy operation as the base file, and
   when the source file is not associated with base file attribute data, identifying the destination file created by the file copy operation as the base file;
   storing the base file attribute data that includes at least the base file relationship between the destination file and the base file;
   determining whether to optimize a data replication operation based at least in part on the stored base file attribute data;
   using the stored base file attribute data to optimize the data replication operation, wherein the optimization includes determining which segments that are common to the base file and the source file have already been sent to a replication target;
   receiving an indication that the file copy operation has been performed;
   when the source file is already associated with base file attribute data, updating the base file attribute data to represent the earlier generation of the destination file as the base file for the source file; and
   when the source file is not associated with base file attribute data, updating the base file attribute data to represent the destination file as the base file for the source file.

2. The method of claim 1, wherein the earlier generation of the destination file comprises a previously-created copy of the source file copied in the file copy operation to create the source file associated with the file copy operation.

3. The method of claim 2, wherein determining the base file relationship programmatically includes determining that the base file was determined previously to be a base file of the source file.

4. The method of claim 1, wherein the base file comprises a copy of the earlier generation destination file as the source file copied in the file copy operation to create the source file associated with the file copy operation.

5. The method of claim 1, wherein the data replication operation is performed with respect to the source file.

6. The method of claim 1, wherein the data replication operation is performed with respect to the base file.

7. The method of claim 1, wherein the optimization includes using the stored base file attribute data to determine which segments common to the base file and the file copied by the file copy operation have already been sent to the replication target.

8. The method of claim 1, wherein in the event the base file has been modified since the base file was created, the data optimization operation is aborted.

9. The method of claim 1, wherein the data replication operation includes replicating data to a secondary deduplication data storage system as the replication target.

10. A data storage system, comprising:
    a data storage device; and
    a processor coupled to the memory or other data storage device and configured to:
    determine programmatically a base file relationship between a destination file created by a file copy operation and a base file of a source file associated with the file copy operation, wherein determining the base file relationship includes
    when the source file is already associated with base file attribute data, identifying an earlier generation of the destination file created by the file copy operation as the base file; and
    when the source file is not associated with base file attribute data, identifying the destination file created by the file copy operation as the base file;
    store in the data storage device the base file attribute data that includes at least the base file relationship between the destination file and the base file;
    determine whether to optimize a data replication operation based at least in part on the stored base file attribute data;
    use the stored base file attribute data to optimize the data replication operation, wherein the optimization includes determining which segments that are common to the base file and the source file have already been sent to a replication target;
    receive an indication that the file copy operation has been performed;
    when the source file is already associated with base file attribute data, update the base file attribute data to represent the earlier generation of the destination file as the base file for the source file; and
    when the source file is not associated with base file attribute data, update the base file attribute data to represent the destination file as the base file for the source file.

11. The system of claim 10, wherein the earlier generation of the destination file comprises a previously-created copy of the source file copied in the file copy operation to create the destination file.

12. The system of claim 11, wherein determining the base file relationship programmatically includes determining that the base file was determined previously to be a base file of the source file.

13. The system of claim 10, wherein the base file comprises a copy of the earlier generation destination file as the source file copied in the file copy operation to create the destination file.

14. The system of claim 10, wherein in the event the base file has been modified since the base file was created, the data optimization operation is aborted.

15. A computer program product embodied in a tangible non-transitory computer readable storage medium and comprising computer instructions for:
    determining programmatically a base file relationship between a destination file created by a file copy operation and a base file of a source file associated with the file copy operation, wherein determining the base file relationship includes when the source file is already associated with base file attribute data, identifying an earlier generation of the destination file created by the file copy operation as the base file, and updating the base file attribute data to represent the earlier generation of the destination file as the base file for the source file; and when the source file is not associated with base file attribute data, identifying the destination file created by the file copy operation as the base file, and updating the base file attribute data to represent the destination file as the base file for the source file;

storing the base file attribute data that includes at least the base file relationship between the destination file and the base file;

determining whether to optimize a data replication operation based at least in part on the stored base file attribute data;

using the stored base file attribute data to optimize the data replication operation, wherein the optimization includes determining which segments that are common to the base file and the source file have already been sent to a replication target;

receiving an indication that the file copy operation has been performed;

when the source file is already associated with base file attribute data, updating the base file attribute data to represent the earlier generation of the destination file as the base file for the source file; and when the source file is not associated with base file attribute data, updating the base file attribute data to represent the destination file as the base file for the source file.

16. The computer program product of claim 15, wherein in the event the base file has been modified since the base file was created, the data optimization operation is aborted.

* * * * *